3,118,924

ALLYL ESTERS OF MONO-ETHER SUBSTITUTED DITHIOCARBAMIC ACIDS
Marion W. Harman, Nitro, and Harry W. Kilbourne, St. Albans, W. Va., assignors to Monsanto Chemical Company, St. Louis, Mo., a corporation of Delaware
No Drawing. Filed Sept. 11, 1958, Ser. No. 760,293
10 Claims. (Cl. 260—455)

This invention relates to a new class of compounds. More particularly, this invention relates to allyl esters of dithiocarbamic acids containing one hydrogen and one ether or thioether substituent on the nitrogen.

The compounds of this invention may be represented by the general formula

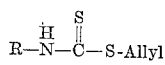

where R is an organic radical, preferably aliphatic in nature, containing an ether or thioether group. A carbon atom of the said organic radical is attached to nitrogen but the carbon chain is interrupted by at least one oxygen or sulfur atom. Examples of R comprise alkoxyalkyl, alkenyloxyalkyl, alkylthioalkyl and alkenylthioalkyl. More particularly, examples of R comprise methoxyethyl, ethoxypropyl, propoxypropyl, isopropoxypropyl, butoxypropyl, methoxyhexyl, ethylhexoxyethyl, nonyloxyethyl, allyloxyethyl, butenyloxyethyl, propargyloxypropyl, methylthioethyl and ethylthiopropyl. These compounds comprise nematocides, germicides, industrial preservatives, soil fumigants and herbicides.

The new esters may be prepared by condensing salts of the corresponding dithiocarbamic acids with allyl halides. The salts are also believed to be new compounds and possess biological properties similar to the allyl esters. A general formula of typical preferred salts within the purview of the invention is

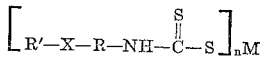

where X is oxygen or sulfur, R is an alkylene radical having from 2 to 6 carbon atoms, R' represents alkyl, alkenyl, alkynyl and alkoxyalkyl radicals having up to 9 carbon atoms, M is a salt forming element and includes the alkali metals, e.g. Na, K, Li, etc., alkaline earth metals, e.g. Ca, Ba, Mg, Sr, heavy metals, e.g. Zn, Cd, Cu, Pb, Hg, Fe, Co, Ni, Cr, Mn, etc. and ammonium radicals such as ammonium, trimethylamine, triethanolamine, etc. and $n$ is the valence of M.

As illustrative of salts which come within the purview of this invention, there may be mentioned:

Sodium-N-methoxyethyl dithiocarbamate
Potassium-N-ethoxypropyl dithiocarbamate
Barium-N-butoxypropyl dithiocarbamate
Zinc-N-ethoxypropyl dithiocarbamate
Cupric-N-methoxyethyl dithiocarbamate
Ammonium-N-methoxyethyl dithiocarbamate
Triethanolammonium-N-methoxyethyl dithiocarbamate
Triethylammonium-N-methoxyethyl dithiocarbamate
Sodium-N-methoxyhexyl dithiocarbamate
Sodium-N-2-ethylhexoxyethyl dithiocarbamate
Sodium-N-n-nonyloxyethyl dithiocarbamate
Ammonium-N-allyloxyethyl dithiocarbamate
Ammonium-N-2-butenyloxyethyl dithiocarbamate
Ammonium-N-propargyloxypropyl dithiocarbamate
Sodium-N-2-chloroallyloxyethyl dithiocarbamate
Sodium-N-methylthioethyl dithiocarbamate
Sodium-N-ethylthiopropyl dithiocarbamate.

The free dithiocarbamic acids are unstable under ordinary conditions but stable derivatives may be prepared. Salts may be prepared by reacting the appropriate amine, carbon disulfide and a reagent containing the desired salt forming constituent. The reactions are preferably carried out in aqueous media, however, suitable solvents such as alcohols, ketones and the like may be employed. Stoichiometric proportions of the reactants are preferable. Generally, temperatures of 30° C. or below are employed in this reaction, with temperatures of 10-20° C. being preferred. Since this is a liquid phase reaction atmospheric pressures are generally used. The heavy metal salts may be made by first preparing the alkali metal salt of the desired mono-N-substituted dithiocarbamic acid and then reacting the alkali metal salt with a water-soluble heavy metal salt, such as zinc sulfate, cuprous acetate, cadmium acetate, manganous acetate, etc. The organic nitrogen base or ammonium salt derivatives may be prepared in the same manner, i.e. by reacting the sodium mono-N-substituted dithiocarbamate with the appropriate hydrogen chloride salt of the organic nitrogen base but are better made directly, employing the nitrogen base in the $CS_2$ amine reaction.

The following examples illustrate the preparation but are not to be taken as limitative.

EXAMPLE 1

To a reactor equipped with a sealed stirrer, a thermometer, reflux condenser, dropping funnel and ice bath there is charged 50 cc. of water and 12 grams of sodium hydroxide and the contents are cooled to 20° C. 33.5 grams (0.3 mole) of methoxyethyl amine are then added with stirring. To the resulting mixture there is added dropwise, over a period of ten minutes, 30.4 grams (0.4 mole) of carbon disulfide while maintaining the temperature between 15 and 25° C. The mixture is stirred for one hour at room temperature and the excess carbon disulfide is removed. This solution was diluted to 130 cc. with water and is found to contain 40% by weight of sodium-N-methoxyethyl dithiocarbamate.

To the solution of sodium-N-methoxyethyl dithiocarbamate so prepared there is added all at once 25.5 grams (0.3 mole) of allyl chloride and the mixture is stirred for 5 hours. The heavy product layer which separates is washed neutral with water and dried at 100° C./1 mm. The allyl-N-2-methoxyethyl dithiocarbamate is obtained as a red liquid analyzing 7.0% nitrogen and 31.5% sulfur as compared to 7.3% nitrogen and 33.5% sulfur calculated for $C_7H_{13}NOS_2$.

EXAMPLE 2

To a suitable reactor there is added 58.6 grams (0.5 mole) of 3-isopropoxypropylamine, 80.0 grams (0.5 mole) of 25% sodium hydroxide and 150 grams of water. There is then added 38.0 grams (0.5 mole) of carbon disulfide over a period of seven minutes. During the addition the temperature is maintained at 15-21° C. by means of an ice bath. The ice bath is removed and the mixture is stirred for thirty minutes, then 38.3 grams (0.5 mole) of allyl chloride is added all at once, causing a temperature rise from 25° to a maximum of 46° C. in eight minutes. The product is stirred for five hours and the upper oily layer which separates is washed neutral with water and dried by heating at 100° C./1 mm. The allyl-N-3-isopropoxypropyl dithiocarbamate is obtained as an amber colored liquid analyzing 6.0% nitrogen and 25.6% sulfur as compared to 6.0% nitrogen and 27.5% sulfur calculated for $C_{10}H_{19}NOS_2$.

EXAMPLE 3

Substituting 44.6 grams (0.5 mole) of 3-methoxypropyl amine for the 3-isopropoxypropyl amine of Example 2, the solution is cooled to 10° C. The carbon disulfide is added in three minutes at 10-14° C. and the mixture is stirred for thirty minutes with intermittent cooling, keeping the temperature at 20–25° C. Addition of the allyl chloride all at once causes the temperature to rise from 25° to a maximum of 49° C. in ten minutes. The allyl-N-3-methoxypropyl dithiocarbamate is isolated as described. The red liquid analyzes 6.7% nitrogen and 29.1% sulfur as compared to 6.8% nitrogen and 31.2% sulfur calculated for $C_8H_{15}NOS_2$.

EXAMPLE 4

In a reactor provided with a sealed stirrer, thermometer, reflux condenser, dropping funnel and ice bath is charged 43.5 grams (0.5 mole) of 2-vinyloxyethyl amine, 80 grams (0.5 mole) of 25% sodium hydroxide and 150 grams of water. To this mix is added with stirring over a period of five minutes at 15–20° C. 38 grams (0.5 mole) of carbon disulfide. The ice bath is then removed and stirring continued for thirty minutes. The resulting solution contains 29.8% by weight sodium 2-vinyloxyethyl dithiocarbamate.

To the solution of the sodium salt so prepared is added 38.3 grams (0.5 mole) of allyl chloride in one portion. This causes the temperature to rise from 25° to 46° C. in ten minutes. Stirring is continued for five hours and the organic layer which separates is filtered through clay, taken up in 150 ml. of ether, washed with water until the washings are neutral and heated in vacuo up to 100° C./5 mm. The allyl N-2-vinyloxyethyl dithiocarbamate which remains as a residue is a red oil. The yield is 85.7%. Analysis gives 7.16% nitrogen and 30.65% sulfur as compared to 6.89% nitrogen and 31.54% sulfur calculated for $C_8H_{13}NOS_2$.

EXAMPLE 5

A solution is prepared from 16 grams (0.15 mole) of 3-ethoxypropyl amine, 100 ml. of ethyl alcohol and 20 ml. of ammonium hydroxide. The solution is cooled to 20–25° C. and stirred while adding to it 11.5 grams (0.15 mole) of carbon disulfide. The reaction mixture is then stirred for one hour. Stirring is continued while 11.5 grams (0.15 mole) of allyl chloride is added in one portion. After standing at room temperature over night, 250 ml. of water and 200 ml. of ether are added to the reaction mixture. The layers are allowed to separate and the ether layer is washed and dried. The ether is removed by stripping at 50° C. at about 40 mm. The allyl-N-3-ethoxypropyl dithiocarbamate is a yellow oil analyzing 6.76% nitrogen and 30.55% sulfur as compared to 6.29% nitrogen and 29.24% sulfur calculated for $C_9H_{17}NOS_2$.

EXAMPLE 6

Substituting 17.5 grams (0.15 mole) of 3-propoxypropyl amine for the 3-ethoxypropyl amine in the procedure of Example 5 gives allyl N-3-propoxypropyl dithiocarbamate as a yellow oil analyzing 5.66% nitrogen and 28.7% sulfur as compared to 6.00% nitrogen and 27.48% sulfur calculated for $C_{10}H_{19}NOS_2$.

EXAMPLE 7

In this example 28.0 grams (0.15 mole) of 3-(octyloxy)propyl amine is substituted for the amine of Example 5. The allyl N-3-(octyloxy)propyl dithiocarbamate is obtained as a yellow oil analyzing 4.28% nitrogen and 21.0% sulfur as compared to 4.62% nitrogen and 21.13% sulfur calculated for $C_{15}H_{29}NOS_2$.

EXAMPLE 8

A solution is prepared from 23.9 grams (0.2 mole) of 3-(2-hydroxyethoxy)propyl amine, 20 grams of concentrated ammonium hydroxide and 100 ml. of ethyl alcohol. The solution is cooled to 5° C. and stirred while adding to it dropwise at 5–20° C. 15.2 grams (0.2 mole) of carbon disulfide. After stirring for one hour at 25–30° C., 15.3 grams (0.2 mole) of allyl chloride is added in one portion. The reaction mixture is stirred for 24 hours at 25–30° C., 200 ml. of water and 300 ml. of ethyl ether are then added and stirring continued for fifteen minutes longer. The ether layer is washed with water until neutral to litmus, dried over sodium sulfate and the ether is removed in vacuo at a maximum temperature of 30° C. A 93.4% yield of allyl-N-3-(2-hydroxyethoxy)propyl dithiocarbamate is obtained as a viscous oil analyzing 5.64% nitrogen as compared to 5.95% calculated for $C_9H_{17}NO_2S_2$.

EXAMPLE 9

Substituting 32.64 grams (0.2 mole) of 2-methoxy-2'-(3-aminopropoxy)diethyl ether for the 3-(2-hydroxyethoxy)propyl amine of Example 8, allyl-3,6,9-trioxadecyl dithiocarbamate is obtained as an amber liquid analyzing 4.60% nitrogen as compared to 5.01% calculated for $C_{11}H_{21}NO_3S_2$.

EXAMPLE 10

To a suitable reactor there is added 6.5 grams of butoxypropylamine, 1.8 grams of potassium hydroxide and 25 cc. of water. This solution is cooled to 20° C. and 4.2 grams of carbon disulfide is added thereto over a period of ten minutes. During the carbon disulfide addition the temperature is maintained at 20–25° C. The reaction mixture is stirred until a clear solution is obtained. This solution contains 12.2 grams of potassium N-butoxypropyl dithiocarbamate.

Substituting 7.5 grams of triethanolamine for the potassium hydroxide there is obtained 17.8 grams of the triethanolamine salt of N-butoxypropyl dithiocarbamic acid. This product separates as a white flaky precipitate from the reaction mixture and may be recovered from the reaction mixture by filtration.

Substituting 6.25 cc. of 28% $NH_4OH$ for the potassium hydroxide there is obtained 11.25 grams of ammonium N-butoxypropyl dithiocarbamate.

To 100 cc. of aqueous solution containing 122.5 grams (0.5 mole) of potassium N-butoxypropyl dithiocarbamate there is added 34.1 grams (0.25 mole) of $ZnCl_2$. The reaction mixture is maintained at a temperature of approximately 20° C. during the addition. After all the $ZnCl_2$ is in, the mixture is stirred for one hour, filtered and washed with water until the filtrate is clear. On air drying the precipitate, there is obtained a good yield of a white solid identified as zinc-N-butoxypropyl dithiocarbamate.

To 100 cc. of aqueous solution containing 122.5 grams (0.5 mole) of potassium N-butoxypropyl dithiocarbamate there is added 38.3 grams (0.5 mole) of allyl chloride in one portion. After stirring for five hours the product is taken up in ether, washed with water until the washings are neutral and the solvent removed in vacuo. Allyl butoxypropyl dithiocarbamate obtained as the residue is an amber oil.

The problem of controlling harmful and unwanted parasites present in the soil, such as nematodes, is one of considerable complexity. In order to be an effective toxicant, a compound must be able to penetrate the normally impervious outer covering of the worm as well as the enclosing membranes of the larvae and eggs and to interfere with some vital function of the organisms. While the exact mechanism of destroying the soil worm life is not fully understood, it is believed that the effective toxicants destroy or reduce to a low level the effectiveness of vital enzymes. A compound which is effective must be one that will remain in the soil in contact with the undesirable worm life for a sufficient period of time to effect the penetration of the worm and to destroy it by one means or another. To accomplish this result, it is necessary that the toxicant resist the destructive action of soil bacteria, be capable of wetting or penetrating the parasite, possess a substantial water dispersibility, be capable of ready mixture with the soil and possess a sufficiently low vapor pressure so that it does not evaporate before its destructive action is accomplished. Since the exacting requirements of any practical agent cannot be recognized by methods other than by test, it is necessary to observe the effectiveness of chosen compounds against the life cycle of the parasite.

Nematocidal activity was demonstrated by preparing a suspension of the nematode *Panagrellus redivivus* in water and observing through a microscope the motility of the organisms in the presence of 0.1% of the dithiocarbamate. A control experiment containing no added toxicant was also employed. The nematode in aqueous suspension will flex its body at a regular rate and as the nematocide takes effect, the rate of flexing is decreased until death of the parasite occurs.

Table I

| Toxicant | Motility After 24 Hrs., Percent at 0.1% |
|---|---|
| None | 100 |
| Allyl (2-vinyloxyethyl)dithiocarbamate | 0 |
| Allyl (3-methoxypropyl)dithiocarbamate | 0 |
| Allyl (2-methoxyethyl)dithiocarbamate | 0 |
| Allyl (3-ethoxypropyl)dithiocarbamate | 0 |
| Allyl 3,6,9-trioxadecyl dithiocarbamate | 0 |
| Sodium methoxyethyl dithiocarbamate | 0 |
| Sodium ethoxyethyl dithiocarbamate | 0 |
| Sodium methoxypropyl dithiocarbamate | 0 |
| Sodium ethoxypropyl dithiocarbamate | 0 |
| Sodium isopropyloxypropyl dithiocarbamate | 0 |
| Sodium butoxypropyl dithiocarbamate | 0 |

It is intended to cover all changes and modifications of the examples of the invention herein chosen for purposes of disclosure which do not constitute departures from the spirit and scope of the invention.

This application is a continuation-in-part of application Serial No. 546,275, filed November 10, 1955, now U.S. Patent 2,895,980 granted July 21, 1959.

What is claimed is:

1. A compound of the structure

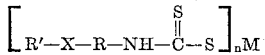

where X is selected from a group consisting of oxygen and sulfur, R represents an alkylene radical containing from 2 to 6 carbon atoms, R' represents a radical containing 1 to 9 carbon atoms selected from a group consisting of alkyl, alkenyl, alkynyl, 3-(2-hydroxyethoxy)propyl, 3,6,9-trioxadecyl and 2-chloroallyl, M is selected from a group consisting of allyl, alkali metal, alkaline earth metal, Zn, Cd, Cu, Pb, Hg, Fe, Co, Ni, Cr, and Mn and ammonium and $n$ represents the valence of M.

2. A compound of the structure

where R represents alkylene of from 2 to 6 carbon atoms and R' represents an alkyl radical containing 1 to 9 carbon atoms.

3. A compound of the structure $$CH_3(CH_2)_nO(CH_2)_{n'}NHCSS\text{—Allyl}$$

where $n$ represents an integer from zero to three and $n'$ represents an integer from two to three.

4. The compound of the structure $$CH_3OCH_2CH_2CH_2NHCSSCH_2CH=CH_2$$

5. A compound of the formula

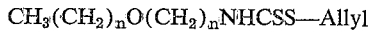

where R is an alkylene radical having from 2 to 4 carbon radcials, R' is an alkenyl radical having up to 4 carbon atoms and M is an alkali metal.

6. A compound of the formula

where R is an alkylene radical having from 2 to 3 carbon atoms and R' is an alkyl group having up to 4 carbon atoms.

7. A compound of the formula

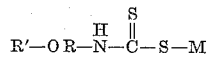

where R is an alkylene radical having from 2 to 4 carbon atoms, R' is a straight chain alkyl radical having up to 4 carbon atoms and M is an alkali metal.

8. Sodium 2-methoxyethyl dithiocarbamate.
9. Sodium 3-butoxypropyl dithiocarbamate.
10. Sodium 2-vinyloxyethyl dithiocarbamate.

References Cited in the file of this patent
UNITED STATES PATENTS

| 2,342,332 | Dean | Feb. 22, 1944 |
| 2,379,965 | Hunt | July 10, 1945 |
| 2,882,291 | Harman et al. | Apr. 14, 1959 |

UNITED STATES PATENT OFFICE
CERTIFICATE OF CORRECTION

Patent No. 3,118,924                          January 21, 1964

Marion W. Harman et al.

It is hereby certified that error appears in the above numbered patent requiring correction and that the said Letters Patent should read as corrected below.

Column 6, line 12, the formula should appear as shown below instead of as in the patent:

$$CH_3(CH_2)_nO(CH_2)_{n'}NHCSS-Allyl$$

column 6, line 23, for "radcials" read -- atoms --.

Signed and sealed this 28th day of July 1964.

(SEAL)

Attest:

ESTON G. JOHNSON                              EDWARD J. BRENNER
Attesting Officer                                  Commissioner of Patents